US005229044A

United States Patent [19]

Shimada et al.

[11] Patent Number: 5,229,044

[45] Date of Patent: Jul. 20, 1993

[54] METHOD OF CHECKING A PICKUP LOAD CELL IN A ROTARY TABLETING MACHINE

[75] Inventors: Yasuo Shimada; Keiji Shimada; Giichiro Kowada, all of Kyoto, Japan

[73] Assignee: Kikusui Seisakusho Ltd., Kyoto, Japan

[21] Appl. No.: 963,668

[22] Filed: Oct. 20, 1992

[30] Foreign Application Priority Data

Apr. 28, 1992 [JP] Japan .................................. 4-109936

[51] Int. Cl.[5] .............................................. B29C 43/08

[52] U.S. Cl. .................................... 264/40.5; 264/109

[58] Field of Search ........................ 264/40.5, 123, 109

[56] References Cited

U.S. PATENT DOCUMENTS 3,255,716 6/1966 Knoechel et al. .

4,030,868 6/1977 Williams ............................. 264/109

4,100,598 7/1978 Stiel et al. ........................... 264/109

4,680,158 7/1987 Hinzpeter et al. ................. 264/40.5

5,004,576 4/1991 Hinzpeter et al. ................. 264/40.5

5,145,693 9/1992 Hinzpeter et al. ................. 264/40.5

FOREIGN PATENT DOCUMENTS 313958 2/1991 Japan .

*Primary Examiner*—Mary Lynn Theisen

*Attorney, Agent, or Firm*—Wegner, Cantor, Mueller & Player

[57] ABSTRACT

A method is provided for checking a pickup load cell in a tablet-making machine which detects the compressive force applied to a tablet being formed. According to the method, a dummy tablet-forming die formed on a support block is inserted into a selected one of the die-receiving holes formed in a rotary table in place of a real die. A reference load cell is put on the support block, and the reference load cell and the support block are sandwitched between an upper pressure rod in place of an upper punch and a lower pressure rod in place of a lower punch. Measurements are made by both the pickup load cell and the reference load cell as the reference load cell is compressed between a pair of pressure rollers, and the value of the compressive force detected by the pickup load cell is corrected in accordance with the value of the compressive force detected by the reference load cell.

4 Claims, 4 Drawing Sheets

METHOD OF CHECKING A PICKUP LOAD CELL IN A ROTARY TABLETING MACHINE

BACKGROUND OF THE INVENTION

This invention generally relates to the art of measuring compressive forces within a tablet-making machine. In particular, this invention relates to a method of checking a pickup load cell provided in a tablet-making machine for measuring and adjusting compressive forces applied to tablets being formed.

In a typical prior-art rotary tableting machine, powder material to be tableted is introduced successively into a plurality of tablet-forming dies that are supported by a rotary table. The powder thus introduced is held between upper and lower punches within the dies, and as the rotary table moves the punches through pressure rollers, the powder in each of the dies is compressed by the punches into a tablet. In this type of tableting machine, a compressive force applied to a tablet during the tablet-forming process is detected by an electric strain meter comprising a pickup load cell, and the data thus obtained are used to precisely control the amount of powder to be introduced into each tablet-forming die.

In order to check if the pickup load cell of the type described indicates exactly and precisely the compressive force on a tablet being formed, it has been customary to remove the pickup load cell from the tablet-making machine, and a change in the compressive force is examined by applying a pressure to the cell directly by a hydraulic machine.

However, this conventional method has inherent drawbacks such as that the mechanical means for transmitting the compressive force to the pickup load cell tends to suffer from loss of lubricating oil, resulting in reduction of transmission of the compressive force, and that some of the compressive force to be transmitted is lost by elongation of the mechanical component parts of the transmitting means due to mechanical fatigue, which leads to various mechanical errors. Therefore, if the pickup load cell is put back onto the tablet-making machine after the checking procedure, there often is a difference between the actual compressive force and the detected value thereof.

The above-described checking method has a further disadvantage that, when tablets of the same type are formed by a plurality of tablet-making machines, effective control of the compressive force applied to the tablets being formed cannot be administered in equal condition in all the machines if such forces change from machine to machine.

SUMMARY OF THE INVENTION

This invention has been accomplished in view of the above-mentioned problems and drawbacks, and it is an object of the present invention to provide a method of checking the compressive force in a tablet-making machine so that the force detected by a pickup load cell provided on the machine indicates the actual compressive force acting on tablets being formed.

In an attempt to accomplish the above and other related objects, this invention contemplates to provide a method of checking a pickup load cell in a tablet-making machine wherein powder material to be tableted is introduced successively into a train of tablet-forming dies held in a plurality of die-receiving holes formed in a rotary table of the machine, and the powder material introduced into each of the dies is compressed into a tablet by upper and lower punches which are put together to compress the powder in the die as the punches pass between a pair of pressure rollers as the table rotates, with the compressive force applied to the tablet being detected by the pickup load cell, and on the basis of the detected value the amount of powder to be introduced into each of the dies is controlled. The method comprises: inserting into one of the die-receiving holes in the rotary table a dummy die formed on the bottom of a support block, so that the dummy die is longitudinally slidable within the hole; putting a reference load cell on the support block; sandwitching the reference load cell and the support block between an upper pressure rod provided in place of the upper punch and a lower pressure rod provided in place of the lower punch; measuring the compressive forces detected by the pickup load cell and the reference load cell as the reference load cell is brought to a standstill under compressed condition between said pressure rollers; or measuring the compressive forces detected by the pickup load cell and the reference load cell in the form of analog waveforms as the reference load cell moves between the pressure rollers upon incremental rotation of the table; and correcting the value of the compressive force detected by the pickup load cell in accordance with the value of the compressive force detected by the reference load cell.

If it is desired to check compressive forces under the actual operating condition of the machine, the method is carried out by inserting the upper end of the lower punch into a selected one of the tablet-forming dies; introducing a predetermined amount of powder into the die into which the lower punch has been inserted; inserting for longitudinal sliding motion an upper dummy punch formed on the bottom of a support block into the die into which the powder has been introduced; putting a reference load cell on the support block; snadwitching the reference load cell and the support block between the lower punch and an upper pressure rod provided in place of the upper punch; measuring the compressive forces detected by the pickup load cell and the reference load cell as the upper dummy punch and the lower punch compress the powder in the die into a tablet; and correcting the value of the compressive force detected by the pickup load cell in accordance with the value of the compressive force detected by the reference load cell.

If all the pickup load cells in a plurality of tablet-making machines are to be checked, a common reference load cell may be advantageously used.

With the method of the invention, the compressive force-sensitive pickup load cell can be checked without removing the same from the tablet-making machine, thereby to make the checking operation easier.

Moreover, with the method of the invention, the pickup load cell is capable of detecting the compressive force under substantially the same condition as in the actual machine operation, and the measured force is corrected in accordance with the output from the reference load cell, on which the compressive force applied to the tablet directly acts. In accordance with the method of the invention, the mechanical errors which would otherwise be caused in the mechanism for transmitting compressive force to the pickup load cell are all eliminated, thereby assuring that the compressive force detected by the pickup load cell is substantially the same as the compressive force actually acting on the tablet· being formed. If a plurality of tableting machines are calibrated by using a common reference load cell, the machines provide a force of the same level, so that when the mahcines are used in making the same type of tablets, a uniform control of the tablet forming process can be effected. As a result, the tablets thus formed are uniform in weight, thickness and hardness, and have a high degree of quality and reliability.

PREFERRED EMBODIMENT OF THE INVENTION

Figure 2:
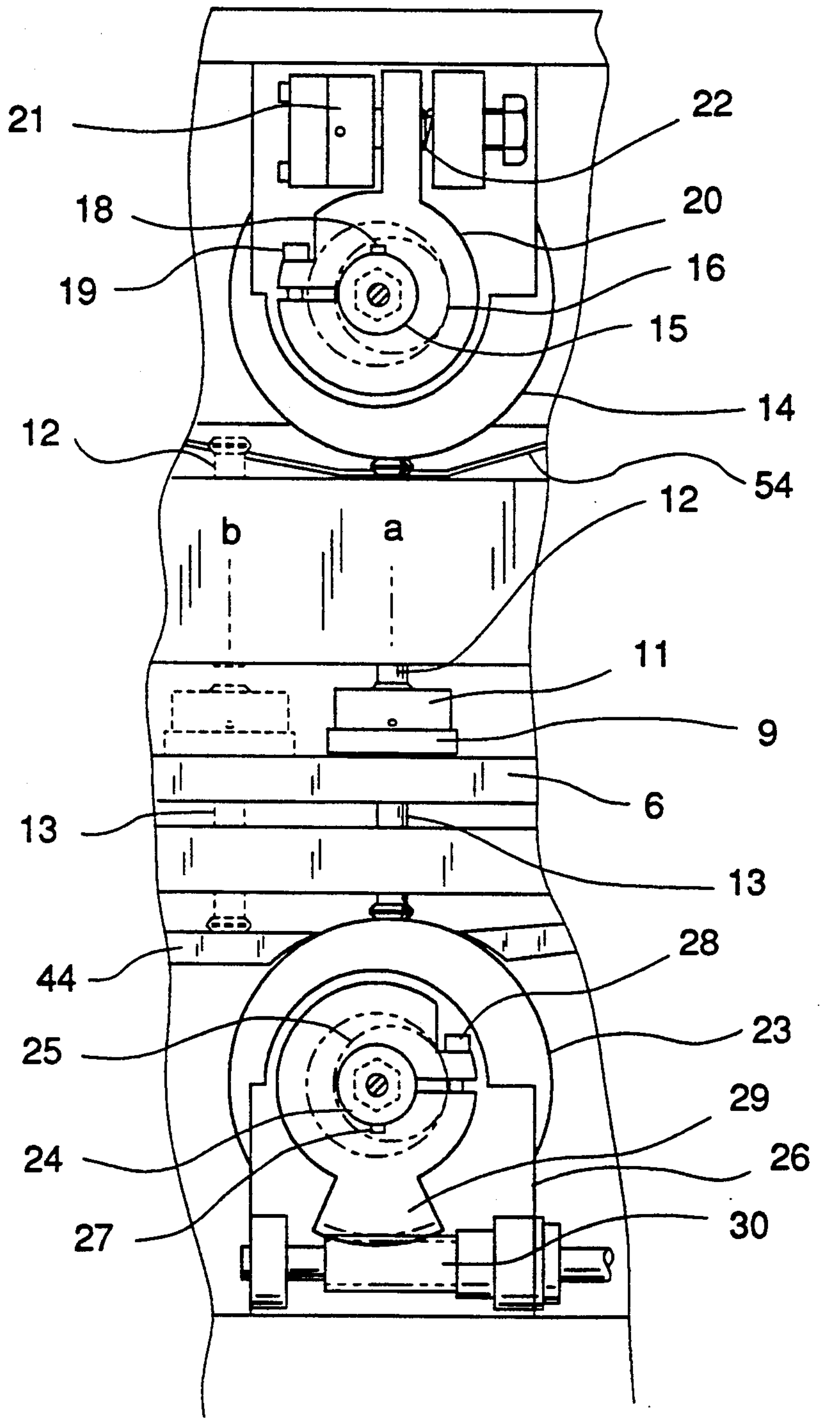
FIG. 2 is a enlarged, partial view of the tablet-making machine shown in FIG. 1.
Figure 3:
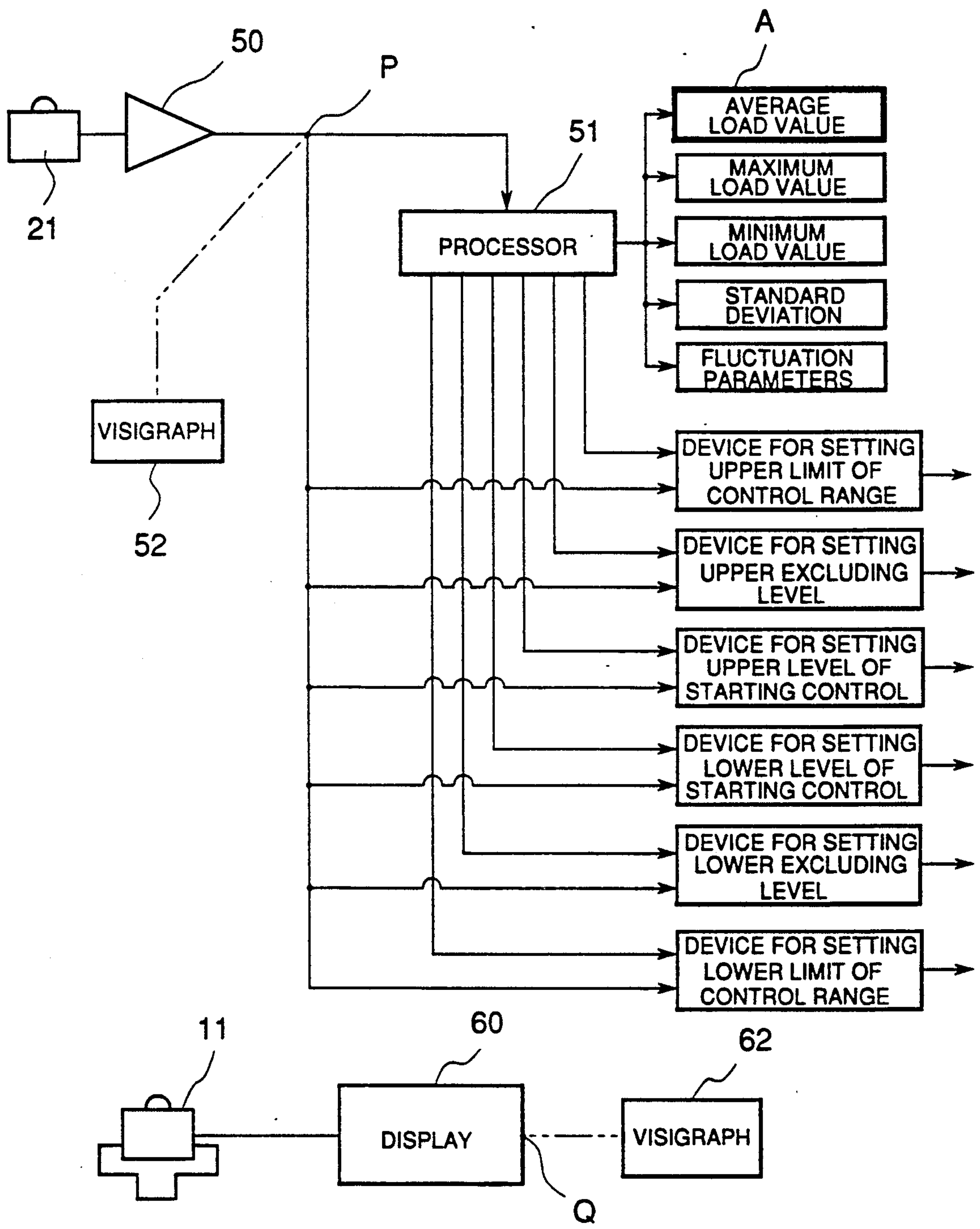
FIG. 3 is a schematic illustration for explaining how the method of the invention is carried out.

A preferred embodiment of the invention will now be described in detail with reference to FIGS. 1 to 3.

Figure 1:
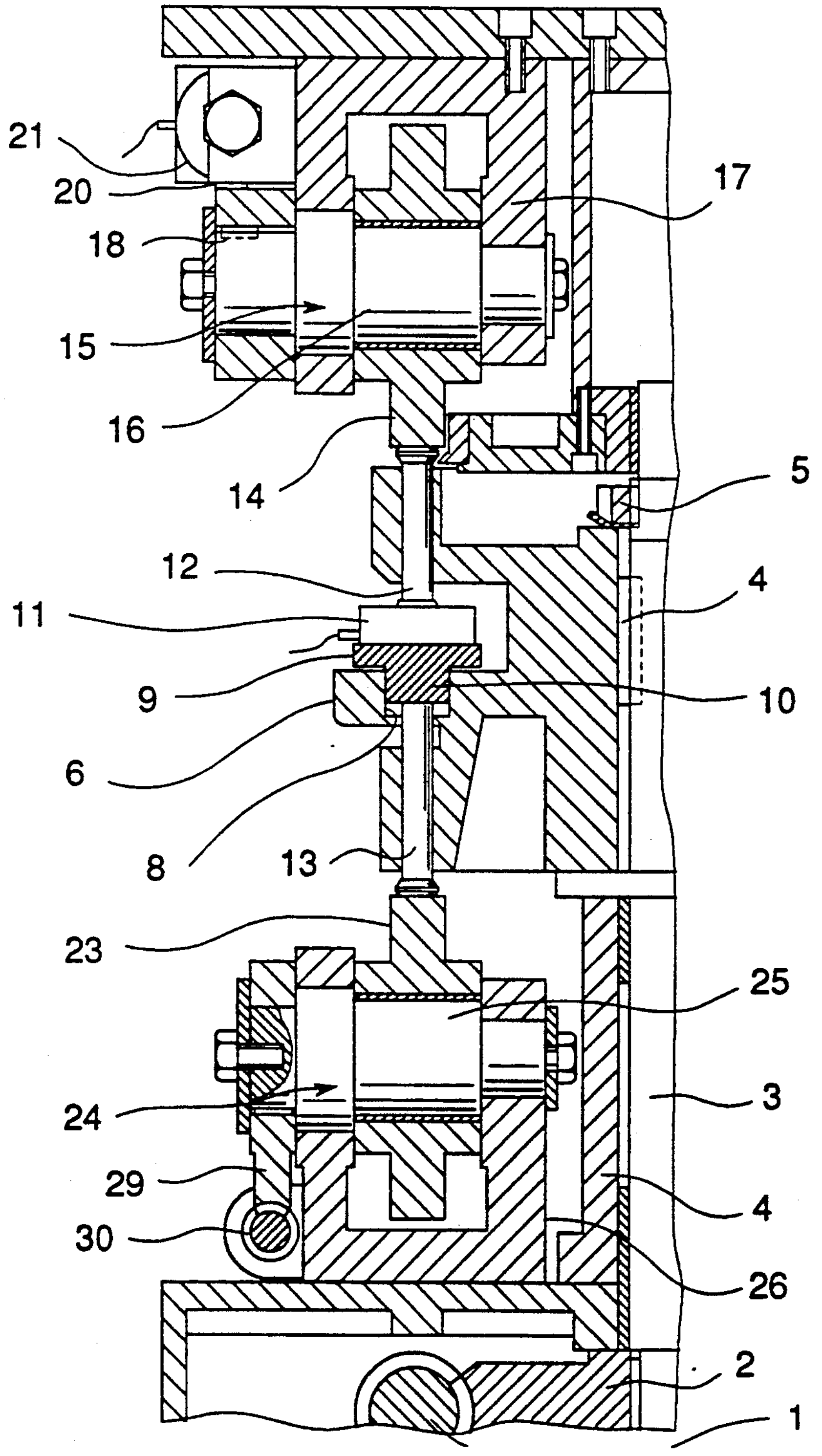
FIG. 1 is a fragmentary view in central cross section of a tablet-making machine to which the method of the present invention is applied.

Referring to the drawings, there is shown in FIG. 1 in enlarged, fragmentary cross section a major part of a typical rotary tablet-making machine. FIG. 2 shows the same part in elevation.

The rotary tablet-making machine is of well-known design, and comprises a rotary table 6 secured to a drive shaft 3 by means of a key 4 and a nut 5. The shaft 3 is rotated by a motor not shown via a combination of a worm wheel 1 and a worm gear 3. As the shaft 3 is rotated by the motor, the table 6 is rotated horizontally. The table 6 is formed with a plurality of die-receiving holes 8, only one of which is shown in FIG. 1.

When the method according to the invention is carried out, the tablet-making die is removed from a selected one of the die-receiving holes 8. A dummy die 10 projecting from the lower face of a support block 9 for supporting a load cell is inserted into the selected hole 8 for vertical sliding motion. A reference load cell 11 is placed on the upper face of the support block 9. The reference load cell 11 is previously adjusted so that it will produce an accurate output. The reference load cell 11 and its support block 9 are held between an upper pressure rod 12 provided in place of an upper tablet-making punch and a lower pressure rod 13 provided in place of a lower tablet-making punch. The rotary table 6 holds the upper pressure rod 12 above the reference load cell 11 and the lower pressure rod 13 below the reference load cell 11 so as to be vertically or longitudinally slidable.

An upper roller 14 is rotatably fitted about an eccentric portion 16 of an upper roller shaft 15, which is supported by an upper roller support 17. A pressure lever 20 is fixed at its one end to the upper roller shaft 15 by means of a key 18 and a bolt 19. The outer end of the pressure lever 20 is in contact with a pickup load cell 21 and is urged against it by the force of a spring 22.

A lower roller 23 is rotatably fitted about an eccentric portion 25 of a lower roller shaft 24, which is supported by a lower roller support 26. A worm wheel level 29 is fixed at its one end to the lower roller shaft 24 by means of a key 27 and a bolt 28. Rotation of an adjusting worm gear 30 causes rotation of the eccentric portion 25 of the lower roller shaft 24, which in turn causes the lower roller 23 to move up and down.

Just like the lower tablet-making punch, the lower pressure rod 13 is guided upward along the outer peripheral surface of the lower roller 23. This upward movement of the lower pressure rod 13 causes both the reference load cell 11 and its support block 9 to be raised, so that the reference load cell 11 urges the upper pressure rod 12 upward thereby to raise the upper roller 14, whereupon the pressure lever 20 on the upper roller shaft 15 is rotated thereby to press the pickup load cell 21.

The pickup load cell 21 is of a conventional type, which detects the compressive force applied to a tablet being formed and translates the pressure which it detects into an electrical signal by means of, for example, an electric strain meter. The electrical signal from the pickup load cell 21 is processed in a suitable manner such as disclosed in Japanese Patent Publication No. 3-13958 to obtain a compression signal. More specifically, as shown in FIG. 3, the electrical signal from the load cell 21 is amplified by an amplifier 50. The amplified signal is then processed by a processor 51, which provides an average, a maximum and a minimum load, standard deviation, fluctuation parameters, etc. in the tablet-making operation, which are indicated on a display. For example, in the illustrated embodiment, when the pickup load cell 21 produces an electrical signal of a predetermined magnitude for more than two seconds, the detected compressive pressure value is displayed on column A for displaying the average load.

The reference load cell 11 is similarly of a conventional design and operates to translate the compressive pressure acting thereon into an electrical signal by means of a strain meter. The electrical signal from the reference load cell 11 is fed into a digital display device 60 quipped with a suitable amplifier, so that the digital display 60 indicates the value of the compressive pressure acting on the reference load cell 11. The reference load cell 11 is previously calibrated so that it can provide an accurate compressive pressure or a value as near to it as possible.

With the arrangement above described, the pickup load cell 21 is checked in the following manner. First, at a position b (shown in dotted line in FIG. 2) in front of a tablet-forming position a (shown in solid line in FIG. 2) between the upper roller 14 and the lower roller 23, the load block 9, the reference load cell 11, the upper pressure rod 12, and the lower pressure rod 13 are all suitably arranged on the rotary table 6 as described above. Then, the rotary table 6 is rotated through a predetermined angular distance thereby to bring the support block 9, the reference load cell 11, the upper pressure rod 12 and the lower pressure rod 13 onto the position a, where the table 6 is stopped. Under the compressing condition, the compressive pressure detected by the reference load cell 11 and indicated on the display 60 is compared with the compressive pressure detected by the pickup load cell 21 and indicated on the display column A for the average load of the tablet-forming machine. If there exists a difference between the two values, the pickup load cell 21 is adjusted by changing the amplification factor of the amplifier 50 so that the compressive pressure detected by the pickup load cell 21 becomes identical to that detected by the reference load cell 11.

The above-mentioned procedure deals with the compressive forces measured while the tablet-making machine is stationary. In order to check the load cell 21 under the operating condition of the machine, visigraphs 52 and 62 are connected to the output P of the amplifier 50 for the pickup load cell 21 and the analog output Q of the display device 60 for the reference load cell, respectively. As the rotary table 6 is rotated for an incremental angle to move the reference load cell 11 past the tablet-forming position between the pressure rollers 14 and 23, the compressive forces acting on the load cells 11 and 21 are recorded by the visigraphs 52 and 62 in the form of analog waveforms, which are compared. If there is a difference between the two waveforms, the amplification factor of the amplifier 50 is changed so that the waveform of the pressure value detected by the pickup load cell 21 coincides with that of the pressure value detected by the reference load cell 11.

Figure 4:
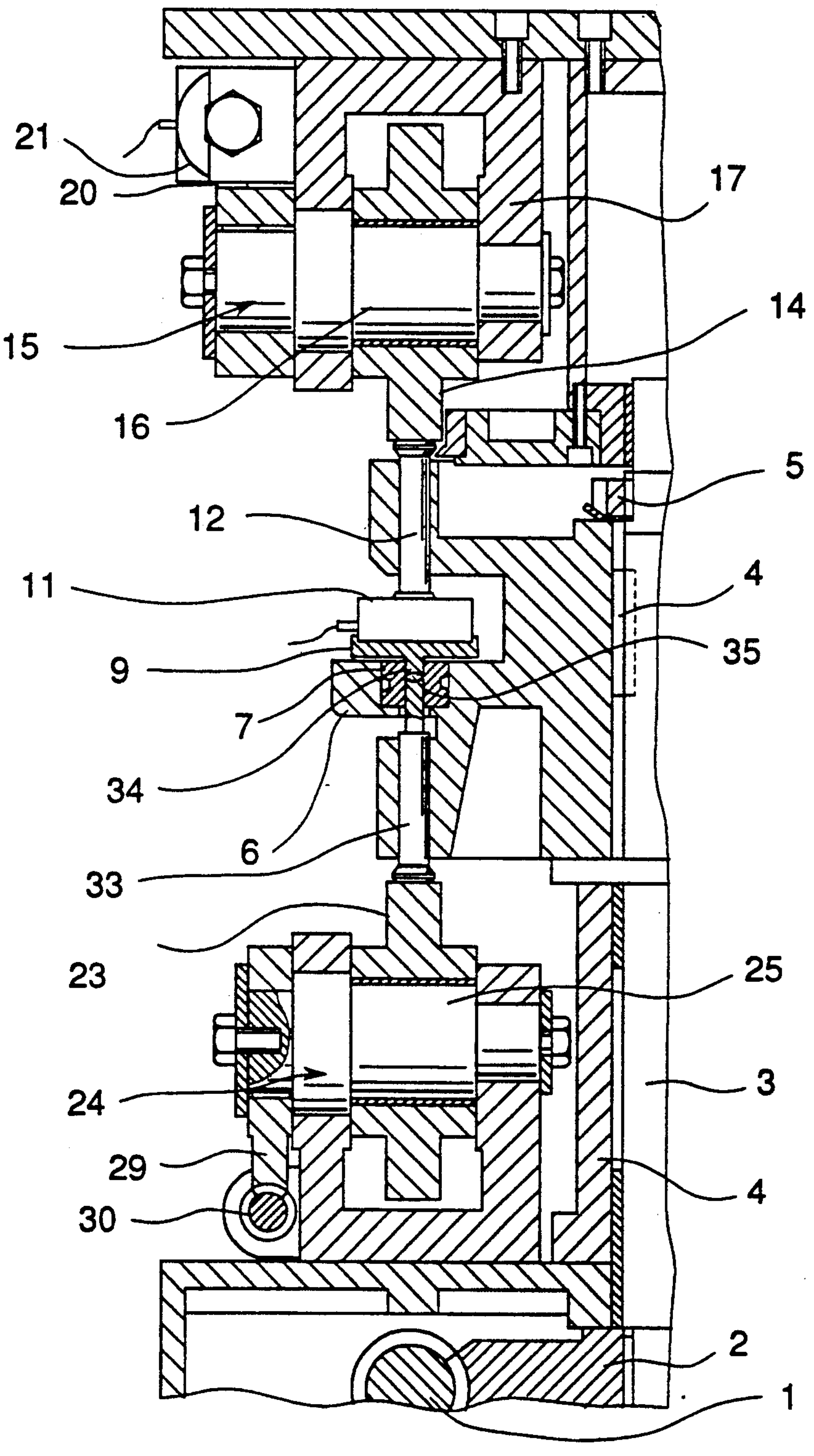
FIG. 4 is a fragmentary view similar to FIG. 1 but illustrating another embodiment of the invention.

In order to check the compressive force applied to powder material to form tablets, the arrangement illustrated in FIG. 4 is used. The tablet-making machine of FIG. 4 is similar to the one shown in FIG. 3, and the corresponding parts are indicated by the same reference numerals without further detailed description thereof.

In this arrangement, suitable powder material to be tableted is first poured into an opening in the die 7, with the upper end of a lower punch 33 having been inserted upwardly into the opening of the die. An upper dummy punch 34 projecting from the lower face of a support block 9 extends into the opening of the die 7 for longitudinal sliding motion therein. A reference load cell 11 is fixedly supported on the support block 9, and both the load cell 11 and the block 9 are sandwitched between the lower punch 33 and an upper pressure rod 12 installed in place of the upper punch. As the powder in the opening of the die 7 is compressed into a tablet by means of the upper dummy punch 34 of the support block 9 and the lower punch 33, the pickup load cell 21 and the reference load cell 11 detect the compressive forces acting thereon.

More sepcifically, before a selected one of the dies 7 provided in the peripheral area of the table 6 is brought into the compressing tablet-forming position a, the upper end portion of the lower punch 33 is inserted into the opening of the die 7 with the bottom end portion of the punch riding on a guide rail 44, and a predetermined amount of powder is introduced into the opening of the die. The lower punch 33 with its bottom riding on the guide rail 44 keeps the introduced powder in place within the die. The reference load cell 11 is disposed on the support block 9, and the upper dummy punch 34 projecting from the bottom of the support block 9 extends into the opening of the die 7. Above the reference load cell 11 the upper pressure rod 12 has its top end suspended from a guide rail 54, so that as the rod 12 approaches the position, it moves downward.

As the table 6 rotates, the lower punch 33 moves upward along the outer circumferential surface of the lower roller 23. The upward movement of the lower punch 33, while compressing the powder in the die 7 into a tablet 35, causes the reference load cell 11 and the upper pressure rod 12 to move upward against the upper roller 14, thereby pressing the pickup load cell 21 by the top end of the upper pressure lever 20.

As the powder is compressed into the tablet 35, both the reference load cell 11 and the pickup load cell 21 are compressed, so that both the compressive forces are detected and displayed. The compressive forces detected by the load cells are recorded by the visigraphs as in the previous embodiment. Then the amplification factor of the amplifier connected to the pickup load cell 21 is adjusted so that the waveform of the compressive force detected by the pickup load cell 21 becomes identical to that of the compressive force detected by the reference load cell 11.

As has been described above in detail, the present invention provides a unique checking method in which the pickup load cell is effectively adjusted so that the load cell indicates exactly the actual compressive force on the tablet being formed. In addition, the present method can be implemented easily as well as quickly without removing the pickup load cell from the tablet-making machine.

It should be particulary noted that, if a common reference load cell is used for more than one machine, it is possible to provide a uniform compressive force in all those machines. It is thus possible to implement an integrated management of operation on all the machines. As a result, it is possible to produce tablets uniform in weight, thickness and hardness, and reliable in quality.

What we claim is:

1. In a tablet-making machine wherein powder material to be tableted is introduced successively into a train of tablet-forming dies held in a plurality of die-receiving holes formed in a rotary table of said machine, and said powder material introduced into each of said dies is compressed into a tablet by upper and lower punches which are put together to compress said powder in said die as said punches pass between a pair of pressure rollers upon rotation of said table, with the compressive force applied to said tablet being formed being detected by a pickup load cell, and on the basis of the detected value the amount of powder to be introduced into each of said dies is controlled; a method of checking said pickup load cell, comprising:

inserting into a selected one of said die-receiving holes a dummy die formed on the bottom of a support block, so that said dummy die is longitudinally slidable within said hole;

putting a reference load cell on said support block;

sandwitching said reference load cell and said support block between an upper pressure rod provided in place of said upper punch and a lower pressure rod provided in place of said lower punch;

measuring the compressive forces detected by said pickup load cell and said reference load cell as said reference load cell is brought to a standstill under compressed condition between said pressure rollers;

and correcting the value of said compressive force detected by said pickup load cell in accordance with the value of said compressive force detected by said reference load cell.

2. In a tablet-making machine wherein powder material to be tableted is introduced successively into a train of tablet-forming dies held in a plurality of die-receiving holes formed in a rotary table of said machine, and said powder material introduced into each of said dies is compressed into a tablet by upper and lower punches which are put together to compress said powder in said die as said punches pass between a pair of pressure rollers upon rotation of said table, with the compressive force applied to said tablet being formed being detected by a pickup load cell, and on the basis of the detected value the amount of powder to be introduced into each of said dies is controlled; a method of checking said pickup load cell, comprising:

inserting into a selected one of said die-receiving holes a dummy die formed on the bottom of a support block, so that said dummy die is longitudinally slidable within said hole;

putting a reference load cell on said support block;

sandwitching said reference load cell and said support block between an upper pressure rod provided in place of said upper punch and a lower pressure rod provided in place of said lower punch;

measuring the compressive forces detected by said pickup load cell and said reference load cell in the form of analog waveforms as said reference load cell moves between said pressure rollers upon incremental rotation of said rotary table;

and correcting the value of said compressive force detected by said pickup load cell in accordance with the value of said compressive force detected by said reference load cell.

3. In a tablet-making machine wherein powder material to be tableted is introduced successively into a train of tablet-forming dies held in a plurality of die-receiving holes formed in a rotary table of said machine, and said powder material introduced into each of said dies is compressed into a tablet by upper and lower punches which are put together to compress said powder in said die as said punches pass between a pair of pressure rollers upon rotation of said table, with the compressive force applied to the tablet being formed being detected by a pickup load cell, and on the basis of the detected value the amount of powder to be introduced into each of said dies is controlled; a method of checking said pickup load cell, comprising:

inserting the upper end of a lower punch into selected one of said tablet-forming dies;

introducing a predetermined amount of powder into said die into which said lower punch has been inserted;

inserting for longitudinal sliding motion an upper dummy punch formed on the bottom of a support block into said die into which said powder has been introduced;

putting a reference load cell on said support block;

sandwitching said reference load cell and said support block between said lower punch and an upper pressure rod provided in place of said upper punch;

measuring the compressive forces detected by said pickup load cell and said reference load cell as said reference load cell is brought to a standstill under compressed condition between said pressure rollers so that said upper dummy punch and said lower punch compress said powder in said die into a tablet;

and correcting said compressive force detected by said pickup load cell in accordance with said compressive force detected by said reference load cell.

4. In a tablet-making machine wherein powder material to be tableted is introduced successively into a train of tablet-forming dies held in a plurality of die-receiving holes formed in a rotary table of the machine, and said powder material introduced into each of said dies is compressed into a tablet in said die by upper and lower punches which are put together to compress said powder in said die as said punches pass between a pair of pressure rollers upon rotation of said table, with the compressive force applied to the tablet being formed being detected by a pickup load cell, and on the basis of the detected value the amount of powder to be introduced into each of said dies is controlled; a method of checking said pickup load cell, comprising:

inserting the upper end of a lower punch into a selected one of said tablet-forming dies;

introducing a predetermined amount of powder into said die into which said lower punch has been inserted;

inserting for longitudinal sliding motion an upper dummy punch formed on the bottom of a support block into said die into which said powder has been introduced;

putting a reference load cell on said support block;

sandwitching said reference load cell and said support block between said lower punch and an upper pressure rod provided in place of said upper punch;

measuring the compressive forces detected by said pickup load cell and said reference load cell in the form of analog waveforms as said reference load cell moves between said pressure rollers upon incremental rotation of said table so that said upper dummy punch and said lower punch compress said powder in said die into a tablet;

and correcting the value of said compressive force detected by said pickup load cell in accordance with the value of said compressive force detected by said reference load cell.

* * * * *